United States Patent [19]

Schaefer et al.

[11] Patent Number: 4,851,188
[45] Date of Patent: Jul. 25, 1989

[54] METHOD FOR MAKING A TURBINE BLADE HAVING A WEAR RESISTANT LAYER SINTERED TO THE BLADE TIP SURFACE

[75] Inventors: Robert P. Schaefer, East Hartford; Walter F. Gustafson, Manchester; David A. Rutz, Glastonbury, all of Conn.; Kenneth E. Taylor, Longmeadow, Mass.

[73] Assignee: United Technologies Corporation, Hartford, Conn.

[21] Appl. No.: 135,956

[22] Filed: Dec. 21, 1987

[51] Int. Cl.4 .............................................. B22F 7/00
[52] U.S. Cl. ................................. 419/19; 29/156.8 B; 419/10; 419/47; 428/552; 428/553; 428/564
[58] Field of Search .............. 419/9, 10, 47; 428/552, 428/553, 564; 29/156.8 B

[56] References Cited

U.S. PATENT DOCUMENTS

| | | | |
|---|---|---|---|
| 3,938,962 | 2/1976 | Feilbach | 428/554 |
| 4,004,889 | 1/1977 | Gale et al. | 428/553 |
| 4,102,955 | 7/1978 | Baker et al. | 264/25 |
| 4,136,276 | 1/1979 | Ashe | 219/378 |
| 4,148,494 | 4/1979 | Zelahy et al. | 277/53 |
| 4,177,661 | 12/1979 | Schwarzbach et al. | 72/128 |
| 4,227,703 | 10/1980 | Stalker et al. | 277/53 |
| 4,232,995 | 11/1980 | Stalker et al. | 415/172 A |
| 4,249,913 | 2/1981 | Johnson et al. | 51/295 |
| 4,305,115 | 12/1981 | Armitage | 361/437 |
| 4,390,320 | 6/1983 | Eisworth | 416/97 R |
| 4,424,066 | 1/1984 | Sarin et al. | 51/295 |
| 4,435,815 | 3/1984 | Evensen | 373/81 |
| 4,438,310 | 3/1984 | Cachat | 219/10.43 |
| 4,501,943 | 2/1985 | Lund | 219/10.43 |
| 4,523,068 | 6/1985 | Lund et al. | 219/10.53 |
| 4,563,329 | 1/1986 | Morishita et al. | 419/9 |
| 4,584,020 | 4/1986 | Waldenstrom | 428/552 |
| 4,589,823 | 5/1986 | Koffel | 416/92 |
| 4,596,692 | 6/1986 | Morishita et al. | 419/9 |
| 4,596,746 | 6/1986 | Morishita et al. | 428/458 |
| 4,604,510 | 8/1986 | Laughlin et al. | 219/10.43 |
| 4,608,128 | 8/1986 | Farmer et al. | 204/16 |
| 4,610,698 | 9/1986 | Eaton et al. | 51/295 |
| 4,622,445 | 11/1986 | Matsen | 219/10.41 |
| 4,627,896 | 12/1986 | Nazmy et al. | 204/37.1 |
| 4,670,215 | 6/1986 | Morishita et al. | 419/9 |

*Primary Examiner*—Stephen J. Lechert, Jr.
*Attorney, Agent, or Firm*—James M. Rashid

[57] ABSTRACT

An abrasive, wear resistant layer is applied to the tip surface of a superalloy gas turbine blade by high temperature sintering operation which produces a high strength bond between the layer and the blade, minimizes gamma prime phase growth, and prevents recrystallization in the blade. Important features of the invention include removing plastic strain damage from the tip surface prior to the sintering operation, using induction heating techniques to sinter a layer of metal powder particles and ceramic particulates to the blade tip surface, and shielding the airfoil and root portion of the blade from the radiant heating source during the sintering operation while at the same time, conductively removing heat from the blade.

12 Claims, 3 Drawing Sheets

METHOD FOR MAKING A TURBINE BLADE HAVING A WEAR RESISTANT LAYER SINTERED TO THE BLADE TIP SURFACE

CROSS REFERENCE

Attention is directed to the copending and commonly assigned patent application entitled "Apparatus for Radiantly Heating Blade Tips", U.S. Ser. No. 135,955, filed by J. D. Formanack et al concurrently with this application.

TECHNICAL FIELD

This invention relates to sintering, and in particular, to methods for sintering a mixture containing ceramic particulates and metal powder particles to the tip surface of a gas turbine engine blade.

BACKGROUND

Gas turbine engines and other similar types of turbomachines include axially spaced apart stages of disks which rotate within a generally cylindrical engine case. Attached to each disk are blades which extend radially outwardly from the engine axis of rotation, towards the case wall and across a gas flowpath. In order to increase the operating efficiency of these types of engines, the amount of gas in the flowpath which leaks through the space between the radially outer end of the blade (its blade tip) and the case wall should be minimized. In some engines, this is accomplished by a design in which the blade tips rub against the case wall as the disks rotate. To make the blade tips less prone to wear, abrasive particulates are sometimes incorporated in a metal matrix which is bonded or otherwise attached to the tip surface. Such wear resistant layers are shown in, for example, U.S. Pat. Nos. 4,249,913 to Johnson et al; 4,227,703 to Stalker et al; 4,232,995 to Stalker et al; 4,390,320 to Eiswerth; 4,589,823 to Koffel; and 4,610,698 to Eaton et al. These patents describe numerous techniques for making a wear resistant layer and applying it to the blade tip surface. Powder metallurgy, electroplating, brazing, and plasma spray techniques are among those mentioned as being useful.

The blades used in modern gas turbine engines are fabricated from high temperature nickel base super alloys and have either a columnar grain or single crystal microstructure. See, e.g., U.S. Pat. No. 3,711,337 to Sullivan and 4,209,348 to Duhl et al. These blades owe their desirable high temperature properties to an optimum microstructure, characterized in part by cubical gamma prime phase particles uniformly distributed in a gamma phase matrix. When a wear resistant layer is applied to the tip surface of such blades, the processes used to apply the layer must not adversely affect this optimum microstructure.

In particular, the process shall not substantially alter the size, shape, or distribution of the gamma prime phase particles, and should not introduce extraneous grains (or crystals) in the microstructure, such as by recrystallization. Recrystallization is especially undesired, since the boundaries of the new grains it produces can be perpendicular to the primary stress axis of the blade, and are prone to cracking during service.

Because of the usefulness of the wear resistant layers in gas turbine engines, engineers continually search for improved fabrication methods. This invention describes a technique which offers several advantages over those of the prior art.

SUMMARY OF THE INVENTION

This invention relates to a method for applying a wear resistant layer containing ceramic particulates uniformly distributed in a metal alloy matrix to the surface of an engine component. The metal matrix and the engine component are each made of high temperature alloys, each different from the other. The method includes the steps of: removing plastic strain damage from the surface of the component which is to receive the wear resistant layer; disposing a mixture of the ceramic particulates and powder particles having the matrix alloy composition onto the component surface, the particulates uniformly distributed throughout the powder particles; radiantly heating the mixture of ceramic particulates and powder particles at a controlled rate to a temperature sufficient to melt most of the powder particles and to cause interdiffusion between the powder and component alloys, while simultaneously removing heat from the component to prevent substantial melting or other metallurgical changes therein; and then cooling the layer to cause the melted powder particles to solidify and sinter to each other and to the component surface to form a wear resistant layer metallurgically bonded to the component surface, the ceramic particulates being entrapped in the solidified metal matrix.

The term "plastic strain damage" is used in the conventional sense, and is meant to describe plastic as opposed to elastic deformation which, when heated to a sufficiently high temperature, recrystallizes to form stress free grains. When the surface of the component which is to receive the wear resistant layer is free of plastic strain damage, it is in a "stress-free condition", and no recrystallization is produced when the component is heated to high temperatures.

The term "sintering" and "liquid phase sintering" are both meant to describe melting of a substantial amount, but not all, of the matrix metal powder particles, followed by cooling below the matrix solidus temperature to solidify the molten metal.

In its most preferred form, the invention is used to apply a wear resistant layer to the tip surface of a directionally solidified, single crystal turbine blade made from a nickel base superalloy. The wear resistant layer contains nickel base superalloy powder particles and silicon carbide abrasive particulates coated with a thin layer of aluminum oxide. The powder particles are mixed with the abrasive particulates and with a thermoplastic resin to form a tape-like material in which the particulates are uniformly distributed throughout the thickness of the tape. The tape is placed upon the tip surface of the blade which has previously been electropolished to remove any plastic strain damage which might recrystallize during the radiant heating step. Then, the airfoil and root portions of the blade are wrapped in a heat insulating material, the blade placed upon a water cooled copper chill plate, and the chill plate moved upwards to position the tip of the blade into an inductively heated graphite susceptor. At the completion of a predetermined heating cycle which melts a majority of the powder particles, the chill plate is moved out of the susceptor, causing the blade to cool and the melted powder particles on the blade tip to solidify. The rate at which the tape is heated within the susceptor, in conjunction with the electropolished tip surface, and the insulated and conductively cooled blade, controls the resulting microstructure of the wear resistant layer and of the blade itself. In particular, process parameters are chosen to control the amount of powder particles which melt, and the temperature to which the blade reaches during the sintering process. Most but not all of the powder particles melt, while at the same time, interdiffusion between the particles and the blade tip occurs. The melted powder particles wet the surface of the blade tip, and some melting of the tip occurs, which can be likened to the surface dissolution which takes place during a conventional brazing process. As a result, a braze-like bond forms between the metal powder particles and blade tip surface.

Because not all of the metal powder particles melt during the heating step, the process for forming the wear resistant layer of this invention is considered to be a type of liquid phase sintering which does not substantially alter the distribution of abrasive particulates within the layer. Wear resistant layers made according to this invention have high strength, and the properties of the blade are not diminished during the high temperature sintering process.

The details of the present invention will become more apparent from the following description of preferred embodiments and the accompanying drawings.

BEST MODE FOR CARRYING OUT THE INVENTION

The invention is described in terms of sintering a wear resistant layer to the tip surface of a nickel base superalloy gas turbine engine blade. However, it should be noted that other components which require a durable, wear resistant surface layer can be fabricated according to the methods described below.

Figure 1:
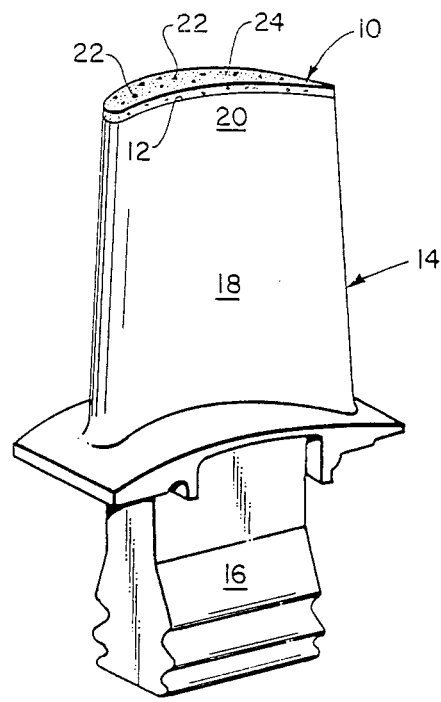
FIG. 1 is a simplified view of an abrasive layer on the tip surface of a turbine blade used in a gas turbine engine.

FIG. 1 shows a wear resistant layer 10 fabricated according to this invention, on the tip surface 12 of a gas turbine engine blade 14. The blade has a root portion 16, an airfoil portion 18, and a tip portion 20 at the radially outer end of the blade 14.

The blade 14 preferably has a single crystal microstructure, although the invention is equally useful with blades that have a columnar grain or equiaxed grain microstructure. Single crystal blades are preferred, as they have the levels of strength which are required for use in advanced gas turbine engines. Single crystal components derive their high strength, in part, from an optimized distribution of cuboidal gamma prime phase particles in a gamma phase matrix, and from the absence of grain boundaries. The optimum size of the gamma prime phase should be in the range of about 0.2-0.5 microns (0.008-0.020 mils). The tip portion of the blade 14 is usually subject to lower operating stresses than the airfoil portion 18 of the blade 14, and some deviation in the optimum gamma prime size at the blade tip portion 20 is permitted. In particular, the size of the gamma prime near the blade tip 20 may be somewhat larger, perhaps up to about 0.7 microns (0.028 mils). However, because of the adverse effects of recrystallization on the mechanical properties of single crystal components, there should be no recrystallized grains in the microstructure.

The wear resistant layer 10 of this invention is characterized by a uniform distribution of abrasive particulates 22 within a high temperature metal alloy matrix 24. The preferred abrasive particulate is alumina coated silicon carbide, of the type described in the aforementioned patent to Johnson et al. The alumina coating prevents chemical interaction between the silicon carbide particulates 22 and the metal matrix 24 during fabrication of the wear resistant layer 10 and during service use. The ceramic particulates have a nominal diameter of about 25-625 microns (1-25 mils), depending on the operating requirements of the layer 10. In most cases, the preferred particulate size is about 125-500 (5-20 mils), most preferably about 375 microns (15 mils). Particulates such as those described in U.S. Pat. No. 4,424,066 to Sarin et al (alumina coated SiAlON) may also be used, as long as they do not react with the metal matrix 24 and have the necessary abrasive characteristics and high temperature stability. To fabricate a wear resistant layer having high strength, the matrix 24 should have a nickel or cobalt base superalloy composition, as described in copending and commonly assigned application Ser. No. 947,067 to Schaefer et al.

The initial step in making the layer 10 is to mix the abrasive particulates with metal powder particles having the matrix composition, and with a volatilizable resin, and then to form the mixture into a sheet of transfer tape, or any other tape-like material. Techniques for making such materials are described in U.S. Pat. Nos. 4,596,746 and 4,563,329, both to Morishita et al, as well as in the aforementioned application to Schaefer et al; all are incorporated by reference. The abrasive particulates should be uniformly distributed throughout the powder metal matrix for optimum wear resistance, and should make up about 10-35 volume percent of the abrasive layer. One advantage of using a tape-like product is that it is easily cut into the size and shape which corresponds to the blade tip surface. The tape is then placed on the blade tip surface 12 and sintered to the surface 12 in a high temperature sintering process, which is described in more detail below. The sintering process must be closely controlled to obtain the necessary properties in the wear resistant layer 10, and to prevent degradation of the base metal blade properties. Of particular concern regarding base metal properties is that there be no recrystallization in the blade during sintering and that the amount of gamma prime phase growth in the blade must be minimized.

The most important properties which the sintered abrasive layer 10 must have, besides wear resistance, are creep strength and oxidation resistance. Both of these properties are significantly influenced by the composition and microstructure of the layer 10, the latter being particularly dependent upon the way in which the tape is sintered to the blade tip surface 12. Porosity should be minimized in the sintered layer 10, and the ceramic particulates 22 should be uniformly distributed throughout the thickness of the layer 10. Of course, the layer 10 must be securely bonded to the blade tip surface 12. For optimum creep strength, the matrix 24 must have a large grain size, meaning that the grains in the solidified matrix are larger than the size of the starting (unmelted) metal powder particles.

In order to achieve a dense matrix having a large grain size, some melting of the metal powder particles must take place during the sintering process. Thus, there must be liquid phase sintering, which must take place under closely controlled conditions. Tests have shown that if too little melting of the metal powder particles take place, the sintered metal matrix will contain some porosity, due to the inability of the melted metal to fill in the interstices between all of the unmelted powder particles. And if too much melting takes place, the ceramic particulates will have a tendency to float in the liquid, because the ceramic is less dense than the metal. If the particulates are able to float or otherwise move around to a considerable extent during the sintering operation, the desired uniform distribution of ceramic particulates within the sintered layer will not be achieved. Between about 50 and 90% of the powder particles should melt during the sintering process. Melting of the powder particles also results in interdiffusion between the particles and the blade tip surface, and produces a braze-type bond between the layer and blade tip on cooling.

The rate at which the temperature is raised during the sintering operation must be closely controlled, especially to control the rate at which the binder in the tape volatilizes. If the binder volatilizes too rapidly, as a result of too rapid a rate of temperature increase, the powder particles and abrasive particulates will be violently expelled from the tape, resulting in a non-useful layer.

Figure 2:
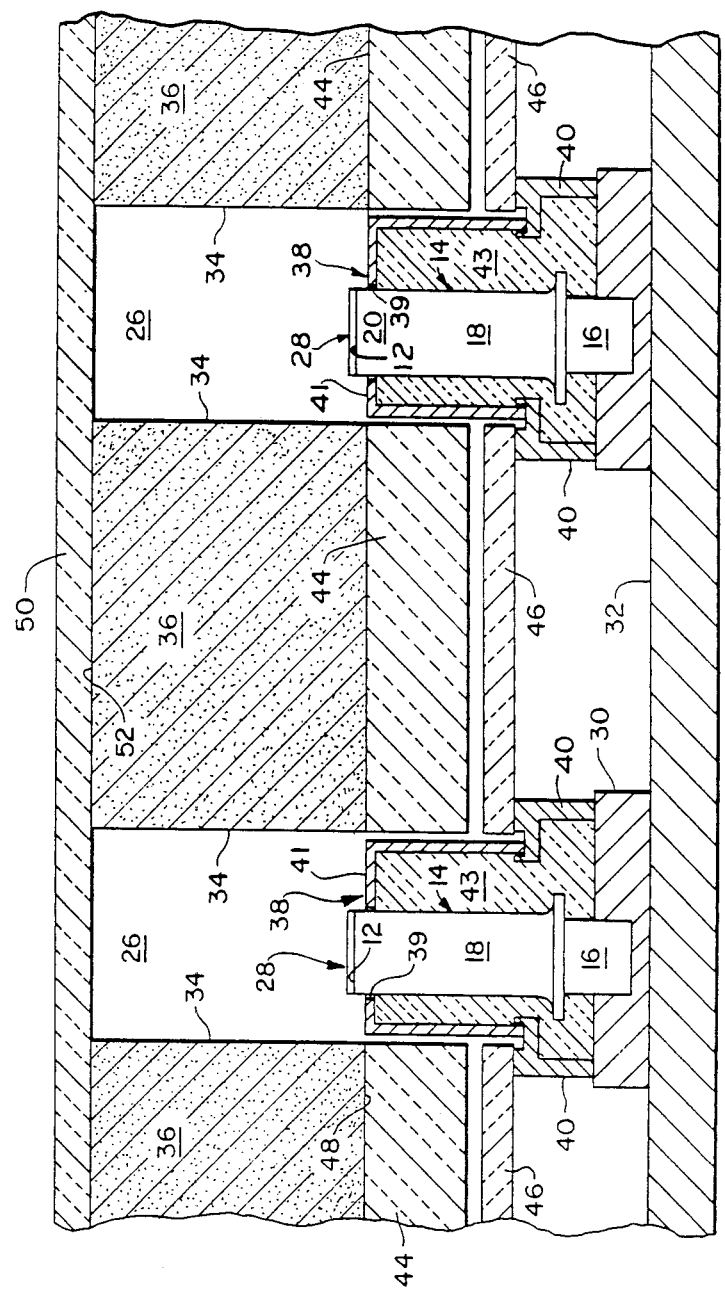

To prevent recrystallization during the sintering operation, plastic strain damage which would otherwise recrystallize during the sintering process must be removed from the surface of the blade before sintering, especially strain damage present in the radially outer portion of the blade, identified as Region A in FIG. 2. (Region A includes the blade tip surface 12.) Conventional electrolytic techniques such as electropolishing may be used; see, e.g., U.S. Pat. Nos. 3,057,764 to LaBoda et al and 3,873,512 to Latanision. Since plastic strain damage is typically confined to very near the surface, no more than only about 12–25 microns (0.5–1 mils) of surface material usually needs to be removed.

To control the temperature to which the blade is heated during the sintering operation, special methods and apparatus are used. These methods and apparatus are best described with reference to FIGS. 2–3.

FIG. 2 shows a blade 14 positioned within a heating chamber 26 which sinters the abrasive carrying tape 28 to the tip surface 12 of the blade 14 according to this invention. As described above, the tape 28 comprises abrasive particulates uniformly distributed within a matrix of superalloy powder particles. A resin type material binds the particulates and powder particles to each other.

Figure 3:
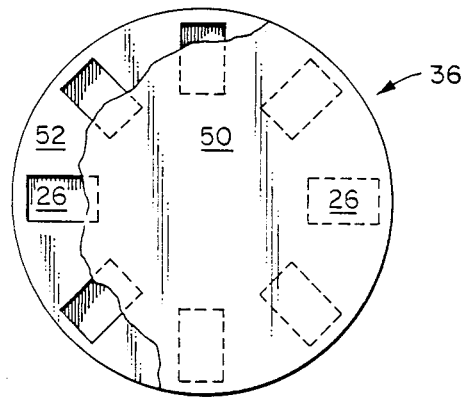
FIGS. 2-3 are simplified views of the apparatus used in the invention.

The heating chamber 26 is defined by slot walls 34 which extend through the thickness of a graphite susceptor 36. The susceptor 36 is inductively heated by low frequency (2,500–3,000 Hz) induction coils which are not shown in the Figure. Preferably, the susceptor 36 is cylindrical in shape, having a plurality of circumferentially spaced apart heating chambers 26, as shown in FIG. 3. To prevent oxidation or other such adverse reactions during the high temperature sintering process, the susceptor 36 is enclosed within a protective atmosphere chamber, preferably a vacuum chamber which is not shown in the Figures.

The blade 14 rests upon a support fixture 30 which is machined to receive the root portion 16 of the blade. The fixture 30 is disposed upon a heat sink 32 such as a water cooled copper chill plate. While the abrasive carrying tape 28 and blade tip portion 20 are heated by the susceptor 36 as described below, the heat sink 32 conducts heat from the blade, which maintains the blade 14 within a desired temperature range.

The temperature of the blade 14 during the sintering process is further controlled by insulation which shields the airfoil and root portions 18, 16, respectively, from the radiant heat source 36. In particular, a tantalum metal shield 38 surrounds the airfoil portion 18 of the blade 14, and rests upon a support 40 which extends from the blade root fixture 30. The shield 38 is a box-like structure having an airfoil shaped cut-out 39 in its top surface 41 through which the blade tip 12 extends. The shield 38 acts as a heat reflector, and also is stuffed with a material 43 which insulates the airfoil and root portions of the blade 14 from the radiant source 36. FIBERFAX ® insulation (the Carborundum Company, Niagara Falls, N.Y.) is the preferred material used in this instance; other suitable insulating materials and shield designs will be apparent to those skilled in the art. Layers of rigid insulating materials 44, 46 also shield the blades 14, as well as the fixture 30 and heat sink 32 from the heat source 36. A first insulation layer 44 is secured to the lower surface 48 of the graphite susceptor 36, and second insulation layer 46 rests upon the support 40. A layer of rigid insulation 50 rests upon the top surface 52 of the susceptor 36.

At the beginning of the sintering process, the susceptor 36 is inductively heated to the maximum sintering temperature, and then the chill plate 32 is moved into proximity with the susceptor 36, so that the tip portion 20 of each blade 14 extends into its respective heating chamber 26, as shown in FIG. 2. The rate at which the blades 14 are raised into their heating chamber 26 is controlled, so that each blade 14 gradually reaches the maximum sintering temperature. A controlled rate is particularly important at the beginning of the process, to avoid an excessive rate of binder volatilization, as discussed above. After the tape 28 and blade tip 12 have been heated to melt between about 50–90% of the powder particles, the chill plate 32 is moved vertically downward, so that the blades 14 are removed from their respective chamber 26. As the blades 14 cool, the molten metal powder particles solidify to each other and to the blade tip surface 12, to form a dense, wear resistant layer. The abrasive particulates are entrapped within the layer 10 as the metal powder particles solidify.

During the sintering process, the melted powder particles wet the tip surface 12 of the blade 14. Some melting and/or dissolution of the surface 12 likely occurs, similar to that which occurs during brazing processes. The resulting joint between the layer 10 and tip surface metallographically appears as a braze-like bond.

Process parameters which influence the success of the sintering process include the position of the blade 14 within the heating chamber 26 and the location of the various types of insulating material relative to the blade 14 and the heat source 36; and the rate at which the temperature is raised during the sintering operation. For example, if too much of the airfoil portion 18 of the blade 14 is directly exposed to the heat source 36, the blade may recrystallize or undergo excessive gamma prime phase growth. Alternatively, if too little of the blade 14 is radiantly heated, an insufficient amount of powder particle melting will take place, and the wear resistant layer 10 will not have the requisite properties.

Use of radiant heat source in this invention, and in particular, an inductively heated graphite susceptor, allows for close control over the actual sintering temperature, and for close control over the rate at which the temperature of the tape 28 and blade tip 12 are increased up to the maximum sintering temperature. Both are necessary for the successful practice of this invention. Tests have shown that when a mixture of ceramic particulates and nickel base superalloy powder was heated by sources such as plasmas (e.g., with plasma spray apparatus), lasers, and electric arcs (e.g., with a tungsten inert gas welding apparatus), the amount of melting was virtually uncontrollable, and the distribution of particulates within the matrix was destroyed. Thus, techniques such as those described in U.S. Pat. No. 4,627,896 to Nazmy et al are not useful in the fabrication of a wear resistant layer.

While the exact relationships between the blade, the heat source, and the insulation will vary depending upon the particular materials and facilities used in making a wear resistant layer on a gas turbine engine component, the example discussed below is provided to illustrate one particular fabrication sequence. This example is meant merely to illustrate several features of the invention, as applied to a particular blade alloy, transfer tape composition, and radiant heating equipment.

The nickel base superalloy composition described in the aforementioned U.S. Patent to Duhl et al was melted and solidified to form a single crystal casting. The casting was removed from its investment casting mold, cleaned, and then machined to the desired length. After machining, the tip surface and airfoil walls within about 12 millimeters (½ inch) from the tip were electrolytically polished to remove plastic strain damage produced during the cleaning and machining operations; about 12 microns (0.5 mils) of material was removed. Then, a tape containing about 25 volume percent of 375 micron (15 mil) alumina coated silicon carbide particulates distributed throughout a nickel base superalloy powder matrix and METHOCEL ® binder (Dow Chemical Company, Midland, Mich.) was affixed to the blade tip surface with NICROBRAZ ® binder (Wall Colmony Corp., Detroit, Mich.). The nominal composition of the powder matrix was, on a weight percent basis, about 25 Cr, 8 W, 4 Ta, 6 Al, 1.2 Si, 1 Hf, 0.1 Y, balance Ni. The powder particles were about minus 80 mesh, U.S. Sieve Series.

The blade was placed within a broach block upon a water cooled copper chill plate, and then a Fiberfrax filled tantalum shield placed over the airfoil portion of the blade, substantially as shown in FIG. 2. About 9 mm (⅜ inch) of the blade tip protruded above the top of the shield.

The blade was then raised at a controlled rate into an evacuated heating chamber (about $10^{-6}$ mm Hg) within an inductively heated graphite susceptor; the temperature within the chamber was about 1,270° C. (2,320° F.). The blade was raised partially into the chamber, such that the temperature of the blade near the blade tip increased at a rate of about 15° C. (27° F.) per minute between ambient conditions and about 480° C. (900° F.). This relatively slow temperature increase allowed the Methocel binder in the tape to slowly volatilize. Then, the blade was raised further into the chamber, until about the outer 9 mm was directly adjacent to the susceptor walls 34; the tip portion temperature then increased at a rate of about 250° C. (45° F.) per minute.

After the blade tip reached 1,270° C. and was held at 1,270° C. for 15 minutes, the blade was removed from the chamber, which caused the melted powder particles to solidify.

Figure 4:
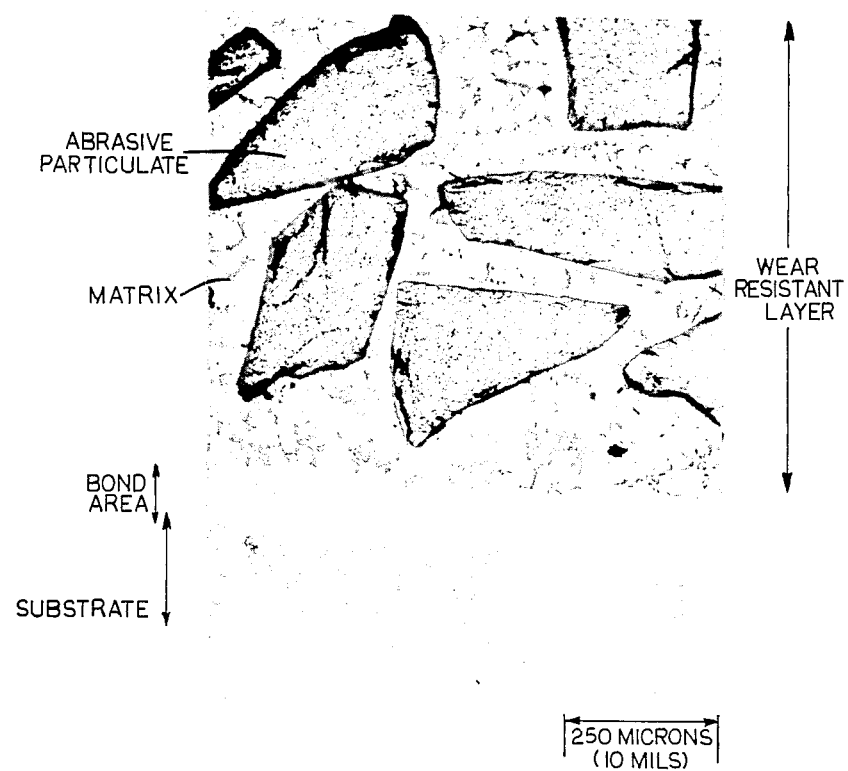
FIG. 4 is a photomicrograph showing the structure of a wear resistant layer made according to this invention.

Metallographic examination of the sintered layer and the blade itself revealed the structure shown in FIG. 4: At the interface between the layer and the blade tip surface was a braze-like bond joint, which indicated that some amount of interdiffusion between the elements in the metal matrix and the elements in the blade alloy took place. It also indicated that a small amount of melting took place at the tip surface. The amount of such melting was considered acceptable, and is believed to be preferable for optimum bond strength. Metallographic examination also revealed a uniform distribution of silicon carbide particulates within the layer, and some remnants of unmelted metal powder particles. It appeared that less than about 10% of the powder particles did not melt during the sintering process.

No recrystallization of the blade was evident. Some of the gamma prime phase near the blade tip was larger than that found in the airfoil portion of the blade; however, the size of this enlarged gamma prime phase was considered to be acceptable.

Although this invention has been shown and described with respect to a preferred embodiment thereof, it should be understood by those skilled in the art that various changes and omissions in the form and detail thereof may be made without departing from the spirit and scope of the invention.

We claim:

1. A method for applying a wear resistant layer to the surface of a high temperature alloy article, the layer having a high temperature alloy composition different than the article composition, the method comprising the steps of removing plastic strain damage from the article surface; disposing metal powder particles having the layer alloy composition onto the article surface; heating the powder particles and the article surface to melt some but not all of the particles while simultaneously removing heat from the article and shielding the portion of the article not covered by the particles from the heat source; and then cooling the article to cause the melted powder particles to solidify.

2. The method of claim 1, wherein the plastic strain damage is removed electrolytically.

3. The method of claim 1, wherein the powder particles and article surface are radiantly heated.

4. The method of claim 3, wherein the powder particles and article surface are heated with an inductively heated susceptor.

5. The method of claim 1, wherein heat is removed from the article by conduction.

6. A method for applying a wear resistant layer to the tip surface of an article made of a high temperature metal alloy and having the shape of a gas turbine blade, the article also having a root portion and an airfoil portion, the layer characterized by a distribution of ceramic particulates in a high temperature metal alloy matrix, the method comprising the steps of removing plastic strain damage from the tip surface and airfoil surface of the article; disposing a mixture of ceramic particulates distributed within metal powder particles having said matrix alloy composition onto the tip surface of the article, the ceramic particulates being substantially nonreactive with the powder particles; heating the tip surface and said mixture thereon to a temperature sufficient to melt between about 50–90 percent of the powder particles and to cause the matrix and article alloys to diffuse with each other; thermally shielding the article airfoil portion and root portion, and removing heat from the article during said heating step; and then cooling the article to cause the melted powder particles to solidify.

7. The method of claim 6, wherein the plastic strain damage is removed electrolytically.

8. The method of claim 6, wherein the powder particles and article surface are radiantly heated.

9. The method of claim 8, wherein the powder particles and article surface are radiantly heated with an inductively heated susceptor.

10. The method of claim 6, wherein said shielding step comprises disposing a heat insulative material about the airfoil and root portions of the article.

11. The method of claim 6, wherein said heat removing step comprises conductively removing heat from the root portion of the article.

12. A method of applying a wear resistant layer of material to the tip surface of a directionally solidified nickel base superalloy turbine blade, the blade also having a root portion and an airfoil portion, and having a columnar grain or single crystal microstructure characterized by gamma prime phase in a gamma phase matrix, the wear resistant layer characterized by aluminum oxide coated silicon carbide particulates distributed in a nickel base superalloy matrix having a different composition than said blade superalloy, the method comprising the steps of electropolishing the blade tip surface and airfoil surface to remove plastic strain damage therefrom; adhering a layer material to the tip surface of the blade, the layer material comprising thermoplastic resin, about 10-35 volume percent alumina coated silicon carbide particulates, and metal powder particles having said matrix composition; inductively heating the article to a first temperature range to volatilize the resin and then to a second temperature range to melt about 70-90% of the powder particles and to cause the matrix and blade alloys to melt and diffuse with each other; during said step of heating, thermally shielding the airfoil portion and root portion of the blade, and conductively transferring heat from the blade into a heat sink, such that recrystallization of the blade is prevented, and gamma prime phase growth is minimized; and cooling the blade to cause the melted powder particles to solidify.

* * * * *